US010206080B2

(12) United States Patent
Lee et al.

(10) Patent No.: US 10,206,080 B2
(45) Date of Patent: Feb. 12, 2019

(54) METHOD FOR TRANSMITTING OR RECEIVING SIGNAL IN WIRELESS COMMUNICATION SYSTEM AND APPARATUS THEREFOR

(71) Applicant: LG ELECTRONICS INC., Seoul (KR)

(72) Inventors: Sangrim Lee, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/691,481

(22) Filed: Aug. 30, 2017

(65) Prior Publication Data

US 2018/0070192 A1    Mar. 8, 2018

Related U.S. Application Data

(60) Provisional application No. 62/385,231, filed on Sep. 8, 2016.

(51) Int. Cl.
| | |
|---|---|
| *H04W 4/00* | (2018.01) |
| *H04W 4/70* | (2018.01) |
| *H04W 72/04* | (2009.01) |
| *H04L 27/26* | (2006.01) |
| *H04W 52/02* | (2009.01) |
| *H04W 72/08* | (2009.01) |

(52) U.S. Cl.
CPC ............ *H04W 4/70* (2018.02); *H04L 27/2628* (2013.01); *H04W 52/0225* (2013.01); *H04W 72/042* (2013.01); *H04W 72/0413* (2013.01); *H04W 72/085* (2013.01)

(58) Field of Classification Search
None
See application file for complete search history.

(56) References Cited

U.S. PATENT DOCUMENTS

2004/0028222 A1\*   2/2004   Sewell ................. G06T 1/0028
380/28

\* cited by examiner

*Primary Examiner* — Suhail Khan
(74) *Attorney, Agent, or Firm* — Birch, Stewart, Kolasch & Birch, LLP

(57) ABSTRACT

A method for transmitting an uplink signal by a user equipment on a carrier where multiple subbands, each having different subcarrier spacing, are multiplexed may include: generating M modulated symbols by modulating uplink data; repeating the M modulated symbols in both upper and lower frequency blocks, which are adjacent to a predetermined frequency block for the M modulated symbols and have the same size as that of the predetermined frequency block; obtaining a tapered pulse by multiplying a total of 3M modulated symbols, which are a result of the repetition, and a total of 3M windowing weight values in an element-wise manner; and transmitting the tapered pulse after performing an inverse Fourier transform, wherein the user equipment can restrict leakage power to subbands unsynchronized with its operating subband to be equal to or lower than a threshold by adjusting a tapering length of the tapered pulse.

18 Claims, 13 Drawing Sheets

METHOD FOR TRANSMITTING OR RECEIVING SIGNAL IN WIRELESS COMMUNICATION SYSTEM AND APPARATUS THEREFOR

This application claims the benefit of U.S. Provisional Application No. 62/385,231 filed on Sep. 8, 2016, which is hereby incorporated in its entirety by reference as if fully set forth herein.

BACKGROUND OF THE INVENTION

Field of the Invention

The present invention relates to a wireless communication system, and more particularly, to a method for transmitting or receiving a signal on a carrier where a plurality of subbands are multiplexed and apparatus therefor.

Discussion of the Related Art

As a number of communication devices have required much higher communication capacity, scenarios for the next generation communication system (e.g., 5G or new RAT) have been discussed in recent years. For example, Enhanced Mobile BroadBand (eMBB), Ultra-reliable Machine-Type Communications (uMTC), and Massive Machine-Type Communications (mMTC) are included in the scenarios. The eMBB corresponds to a next generation mobile communication scenario characterized by high spectrum efficiency, high user experienced data rate, high peak data rate, and the like. The uMTC corresponds to a next generation mobile communication scenario characterized by ultra-high reliability, ultra-low latency, ultra-high availability, and the like and for example, V2X, emergency service, remote control, etc. are included. The mMTC corresponds to a next generation mobile communication scenario characterized by low cost, low energy, short packet, massive connectivity, and the like and for example, the mMTC may include IoT.

FIG. 1 illustrates a relationship between core performance requirements for 5G, which are proposed in IMT 2020, and 5G performance requirements for each service scenario. In particular, in the case of the uMTC service, the over the air (OTA) latency requirement is extremely restricted and high mobility and reliability is required (e.g., OTA Latency: <1 ms, Mobility: >500 km/h, and BLER: <$10^{-6}$).

For the next generation wireless communication, new radio access technologies (RATs) in which the eMBB, mMTC, URLCC, and the like are considered have been discussed.

SUMMARY OF THE INVENTION

The object of the present invention is to provide a method for efficiently transmitting or receiving a signal on a carrier where a plurality of subbands, each having different subcarrier spacing, are multiplexed and apparatus therefor.

It will be appreciated by persons skilled in the art that the objects that could be achieved with the present invention are not limited to what has been particularly described hereinabove and the above and other objects that the present invention could achieve will be more clearly understood from the following embodiments.

To achieve these objects and other advantages, in an aspect of the present invention, provided herein is a method for transmitting an uplink signal by a user equipment (UE) on a carrier where a plurality of subbands, each having different subcarrier spacing, are multiplexed, including: generating M modulated symbols by modulating uplink data; repeating the M modulated symbols in both an upper frequency block and a lower frequency block, which are adjacent to a predetermined frequency block for the M modulated symbols and have the same size as that of the predetermined frequency block; obtaining a tapered pulse by multiplying a total of 3M modulated symbols, which are a result of the repetition, and a total of 3M windowing weight values in an element-wise manner; and performing an inverse Fourier transform on the tapered pulse and transmitting the inverse Fourier transformed tapered pulse. In this case, the UE may restrict leakage power to subbands unsynchronized with an operating subband of the UE to be equal to or lower than a threshold by adjusting a tapering length of the tapered pulse.

In another aspect of the present invention, provided herein is a user equipment (UE) for transmitting an uplink signal on a carrier where a plurality of subbands, each having different subcarrier spacing, are multiplexed, including: a processor configured to generate M modulated symbols by modulating uplink data, repeating the M modulated symbols in both an upper frequency block and a lower frequency block, which are adjacent to a predetermined frequency block for the M modulated symbols and have the same size as that of the predetermined frequency block, obtain a tapered pulse by multiplying a total of 3M modulated symbols, which are a result of the repetition, and a total of 3M windowing weight values in an element-wise manner, and perform an inverse Fourier transform on the tapered pulse; and a transmitter configured to transmit the inverse Fourier transformed tapered pulse under control of the processor. In this case, the processor may be configured to restrict leakage power to subbands unsynchronized with an operating subband of the processor to be equal to or lower than a threshold by adjusting a tapering length of the tapered pulse.

The tapering length may be determined to be inversely proportional to M, the number of the generated modulated symbols.

The tapering length ($T_L$) may be determined according to the following equation: $T_L = 2 \times \text{round}(\beta/2 \times M)$, where 'round' is a rounding function and '$\beta$' is a constant within a range of 0 to 1.

When the threshold is Y dB, the UE may select a greatest value of $\beta$ that makes power in $T_L/2$ subcarrier offset with respect to the predetermined frequency block be equal to or lower by at most Y dB than maximum power from among values of $\beta$ that satisfy the above equation.

The UE may receive downlink control information corresponding to an uplink grant from a base station (BS) and the downlink control information may indicate at least one of '$T_L$', 'M' and '$\beta$'.

The UE may receive information on subcarrier spacing of each subband and information on a guard band from the BS.

The information on the guard band may indicate a guard band of a subband with minimum subcarrier spacing among the subbands and the UE may obtain a guard band of the operating subband using a ratio of subcarrier spacing of the operating subband and the minimum subcarrier spacing of the subband.

The windowing weight values may correspond to weight values of a raised cosine filter.

The weight values of the raised cosine filter may be obtained from the following equation:

$$w_k = \begin{cases} 0 & \text{for } k = 1, \ldots, M - \frac{T_L}{2} \\ \frac{1}{2}\left(1 + \cos\left(\pi\left(-1 + 1/(2T_L) + \left(k - M - \frac{T_L}{2} - 1\right)\big/T_L\right)\right)\right) & \text{for } k = M - \frac{T_L}{2} + 1, \ldots, M + \frac{T_L}{2} \\ 1 & \text{for } k = M + \frac{T_L}{2} + 1, \ldots, 2M - \frac{T_L}{2} \\ \frac{1}{2}\left(1 + \cos\left(\pi\left(1/(2T_L) + \left(k - 2M + \frac{T_L}{2} - 1\right)\big/T_L\right)\right)\right) & \text{for } k = 2M - \frac{T_L}{2} + 1, \ldots, 2M + \frac{T_L}{2} \\ 0 & \text{for } k = 2M + \frac{T_L}{2} + 1, \ldots, 3M \end{cases}$$

where 'k' is a weight value index having a value from 1 to 3M and '$T_L$' indicates the tapering length.

Accordingly, the present invention provides the following effects and/or advantages.

According to the embodiments of the present invention, a user equipment can restrict leakage power to subbands unsynchronized with its operating subband to be equal to or lower than a threshold by adaptively adjusting a tapering length of the pulse that the corresponding user equipment desires to transmit. Thus, it is possible to restrict inter-subband interference, which is caused by absence of orthogonality, on a carrier where a plurality of subbands, each having different subcarrier spacing, are multiplexed.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

Prior to discussing the New RAT, a brief overview of the 3GPP LTE/LTE-A system is presented. The following description of 3GPP LTE/LTE-A can be referenced to help understand New RAT, and some LTE/LTE-A operations and configurations that do not conflict with the design of New RAT may also apply to New RAT. New RAT may be referred to as 5G mobile communication for convenience.

3GPP LTE/LTE-A System

Figure 1:
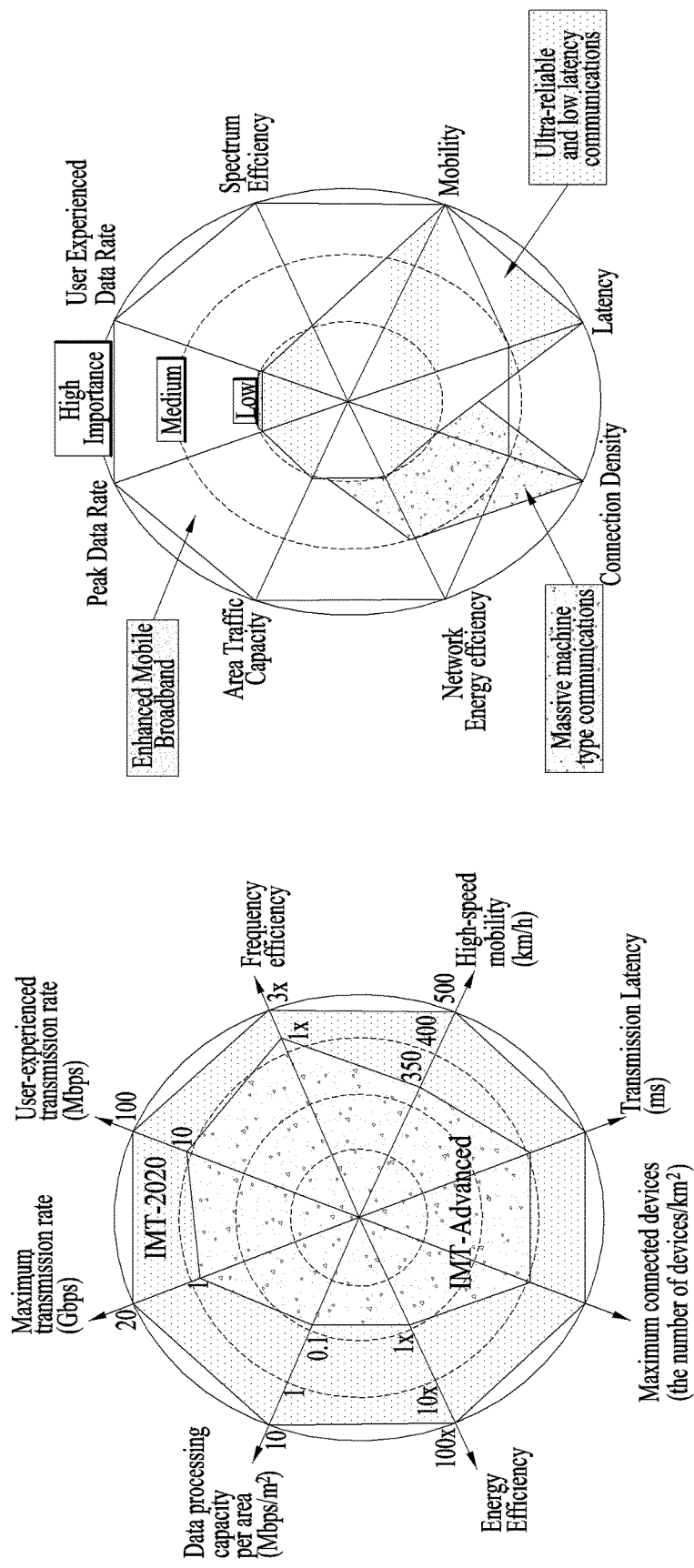
FIG. 1 illustrates 5G service scenarios and performance requirements thereof.
Figure 2:
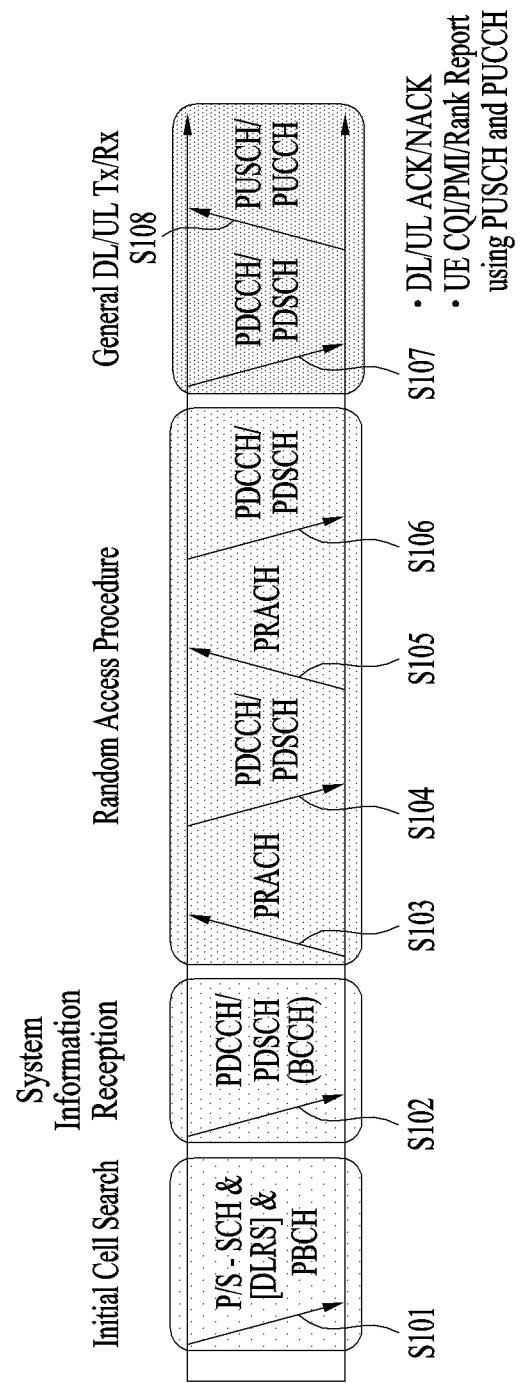
FIG. 2 illustrates physical channels used in the 3GPP LTE/LTE-A system and a general method for transmitting a signal using the same.

FIG. 2 is a diagram for explaining an example of physical channels used for 3GPP LTE system and a general signal transmission method using the same.

Referring to FIG. 2, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel (PBCH) from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (HACK) (A/N). The HARQ-ACK includes at least one of a positive ACK (simply, ACK), a negative ACK (HACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 3:
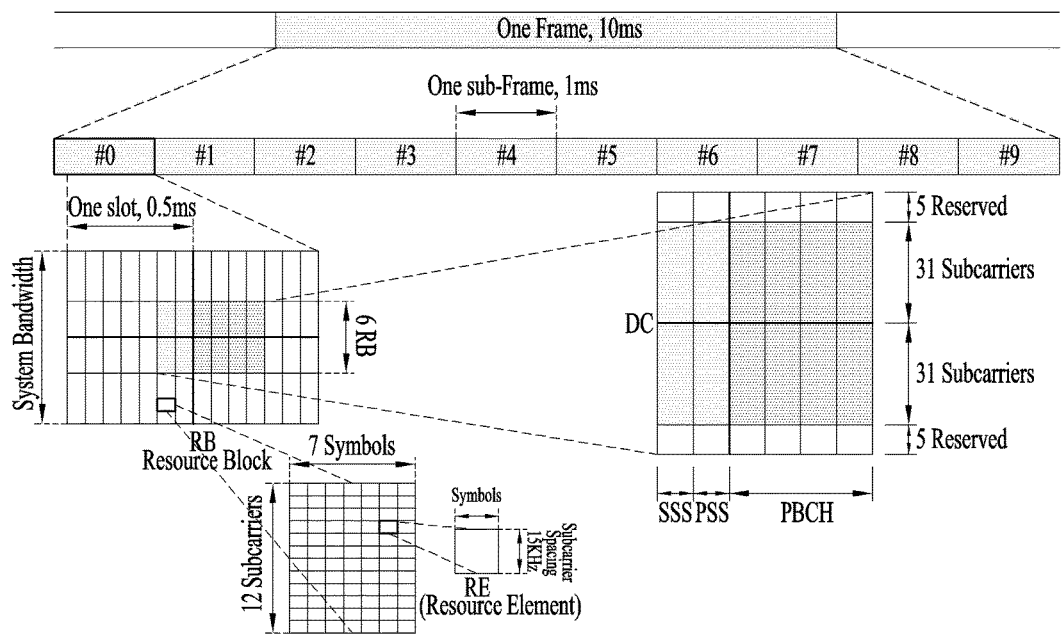
FIG. 3 illustrates a radio frame structure of the 3GPP LTE/LTE-A system.

FIG. 3 is a diagram for explaining an example of a structure of a radio frame of 3GPP LTE/LTE-A system. Referring to FIG. 3, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference. When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel). That is, in the normal CP case, 1 RB is defined by 7 OFDM symbols and 12 subcarriers with 15 kHz spacing.

The center frequency 6 RB transmits a primary synchronization signal (PSS), a secondary synchronization signal (SSS) for synchronization, and a physical broadcast channel (PBCH) for system information transmission. The above-described frame structure, and locations of signal and channels can be changed according to normal/extended CP, TDD/FDD.

Figure 4:
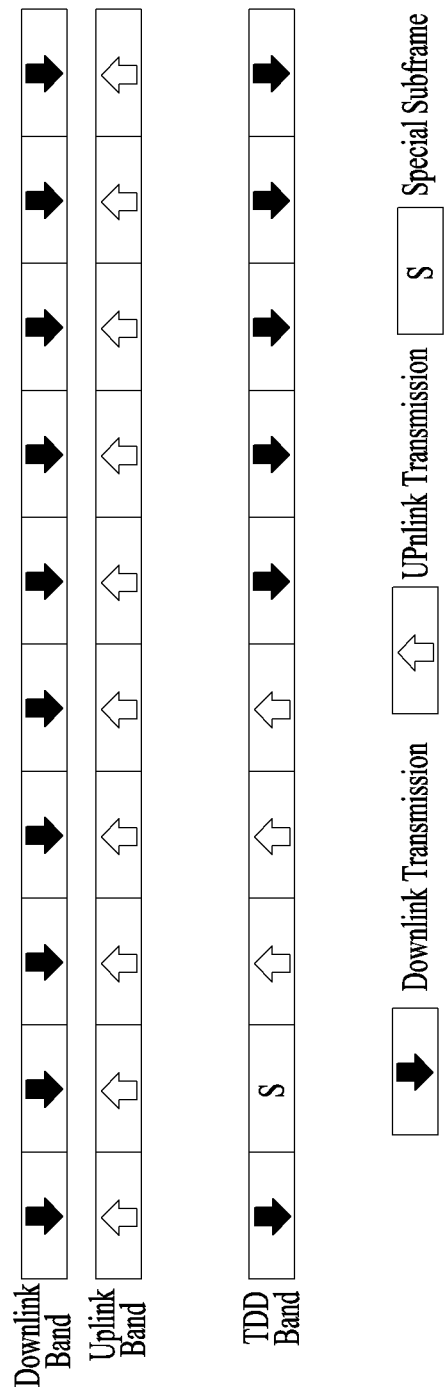
FIG. 4 illustrates FDD and TDD of the 3GPP LTE/LTE-A system.

FIG. 4 illustrates FDD and TDD in an LTE/LTE-A system. Referring to FIG. 4, in the case of FDD, the downlink and uplink frequency bands are divided. In the case of TDD, the downlink region and the uplink region are divided in a unit of subframe(s) in the same band.

New RAT

According to performance requirements for the new RAT, a subframe needs to be newly designed to satisfy low latency.

[Self-Contained Subframe]

Figure 5:
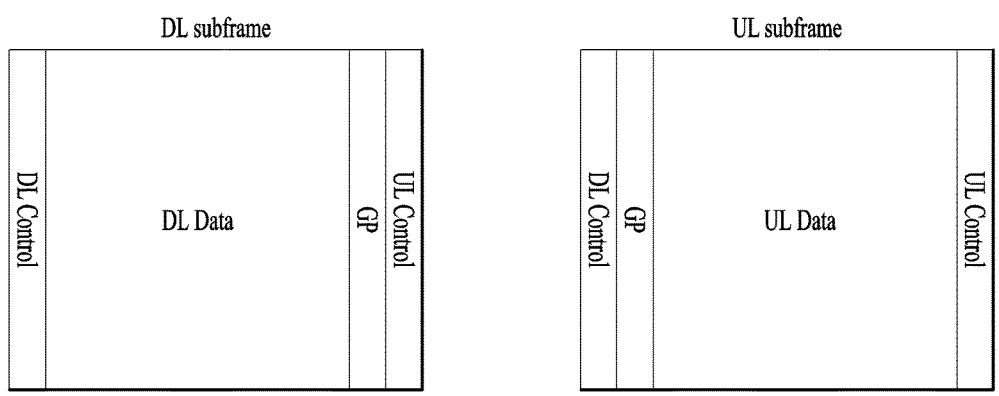
FIG. 5 illustrates a structure of a self-contained subframe according to an embodiment of the present invention.

FIG. 5 illustrates a self-contained subframe proposed for the new RAT. In this specification, the self-contained subframe can be simply referred to as a subframe.

According to a TDD-based self-contained subframe structure, both a resource region for DL and a resource region for UL (e.g., DL and UL control channels) are present in one subframe.

Although the self-contained subframe structure of FIG. 5 shows that a subframe is configured in the following order: DL control region-data region-UL control region, the present invention is not limited thereto. For example, as another self-contained subframe structure, a subframe may be configured in the following order: DL control region-UL control region-data region.

A self-contained subframe can be categorized into a DL self-contained subframe and a UL self-contained subframe according to a data transfer direction of the corresponding subframe.

This self-contained subframe structure requires a time gap that allows a base station (BS) and a user equipment (UE) to switch from transmission mode to reception mode and vice versa. To this end, at least one OFDM symbol on which DL to UL switching is performed is set as a guard period (GP) in the self-contained subframe structure. That is, the GP is located at a point where DL to UL switching is performed. For example, in a DL subframe, the GP is located between a DL data region and a UL control region and in a UL subframe, the GP is located between a DL control region and a UL data region.

Meanwhile, one subframe can be defined as a predetermined time duration. For example, in the new RAT (NR), one subframe can be fixed to a time duration of 1 ms. In this case, since one symbol length is determined according to subcarrier spacing, the number of symbols included in one subframe can also be determined according to the subcarrier spacing. For example, if the subcarrier spacing is 15 kHz, one subframe may include 14 symbols. However, if the subcarrier spacing doubles, i.e., becomes 30 kHz, the duration of one symbol decreases in half and thus, one subframe may include a total of 28 symbols. The subcarrier spacing may become 15 kHz*$2^n$ and the number of symbols included in one subframe may become 14*$2^n$. In this case, n is an integer such as 0, 1, 2, . . . , but it does not need to be a positive integer. If n is a negative integer, for example, −1, one subframe may include a total of 7 symbols.

[Waveform]

Figure 6:
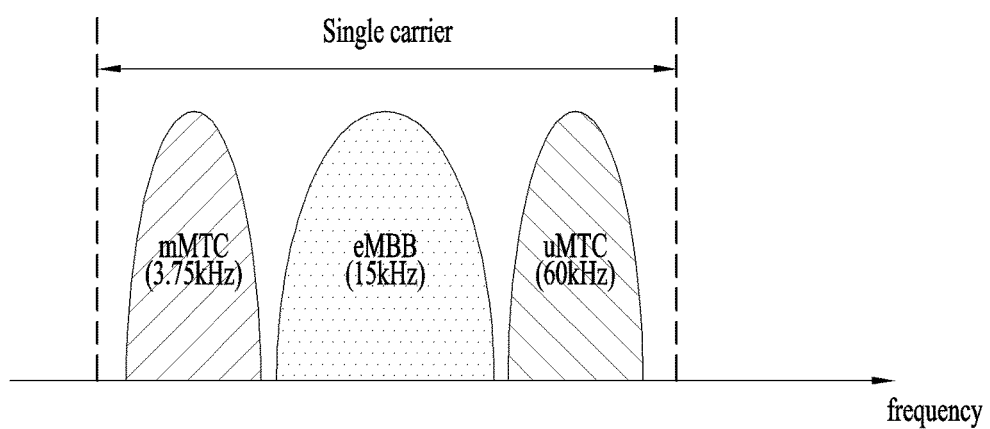
FIG. 6 illustrates 5G main services provided on a single carrier.

FIG. 6 illustrates the concept of providing 5G main services such as mMTC, eMBB, and uMTC services using a single carrier.

As shown in FIG. 6, a plurality of services can be provided on a single carrier. However, in this case, since each service has different requirements (e.g., TTI, delay, etc.), different subcarrier spacing may be required for each service. Moreover, when each service requires different subcarrier spacing, each service may have a different symbol duration and thus, time may not be synchronized between services. In this case, orthogonality between service bands is broken and thus, interference between service bands occurs within a single carrier. Therefore, a new waveform for controlling the interference is required.

Hereinafter, a description will be given of a waveform for implementing different numerology or asynchronous reception on a single carrier and apparatus for transmitting and receiving the waveform with reference to an embodiment of the present invention.

In a situation of mixed numerology or asynchronous reception, interference between adjacent bands may affect system performance. For example, assuming that services are provided through subbands 1 and 2, which are unsynchronized or have different subcarrier spacing, such that in a single carrier, the subband 1 occupies 50 PRBs and the subband 2 occupies 1 PRB, orthogonality should be maintained in the frequency domain to reduce interference between the subbands 1 and 2. In this case, since interference from the subband 1 to the subband 2 is relatively less than that from the subband 2 to the subband 1, a frequency-domain pulse shape of the subband 1 needs to sharper than that of the subband 2.

To provide various services using one carrier as described above, a new waveform is required rather than CP-OFDM.

In addition, according to the conventional time-domain filtering, all filter coefficients should be known to transceivers to satisfy various leakage requirements and filters for all pass band transmission sizes should also be implemented.

Hereinafter, a description will be given of a frequency-domain transmitting and receiving device that can be implemented more efficiently than the time-domain filtering and control a tapering length to transmit passbands with different sizes while satisfying the given leakage requirements.

Tx Structure

Figure 7:
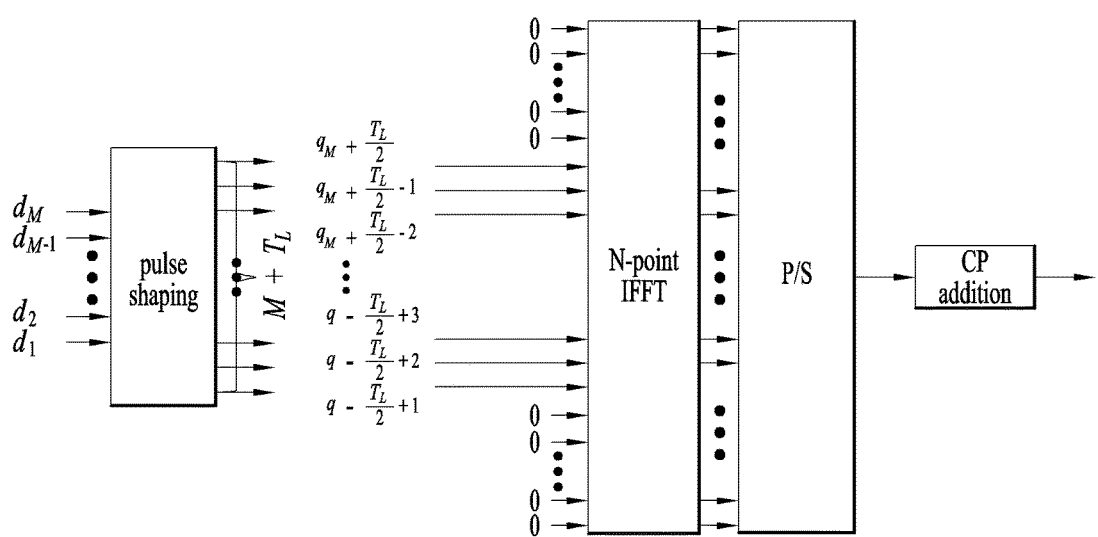
FIG. 7 illustrates a transmitter (Tx) structure according to an embodiment of the present invention.

FIG. 7 illustrates a transmitter (Tx) structure according to an embodiment of the present invention.

In FIG. 7, $d_1$ to $d_M$ indicate modulated symbol 1 to modulated symbol M, respectively and $$q_{-\frac{T_L}{2}+1}, \cdots, q_{M+\frac{T_L}{2}}$$

indicate output values except 0 which are obtained by multiplying windowing weight values in the frequency domain. In addition, $T_L$ indicates a taper length and it is set to 2*round($\beta$/2*M). In this case, it is assumed that $\beta$ has a value from 0 to 1 and N is equal to or greater than 2M (N≥2M).

Figure 8:
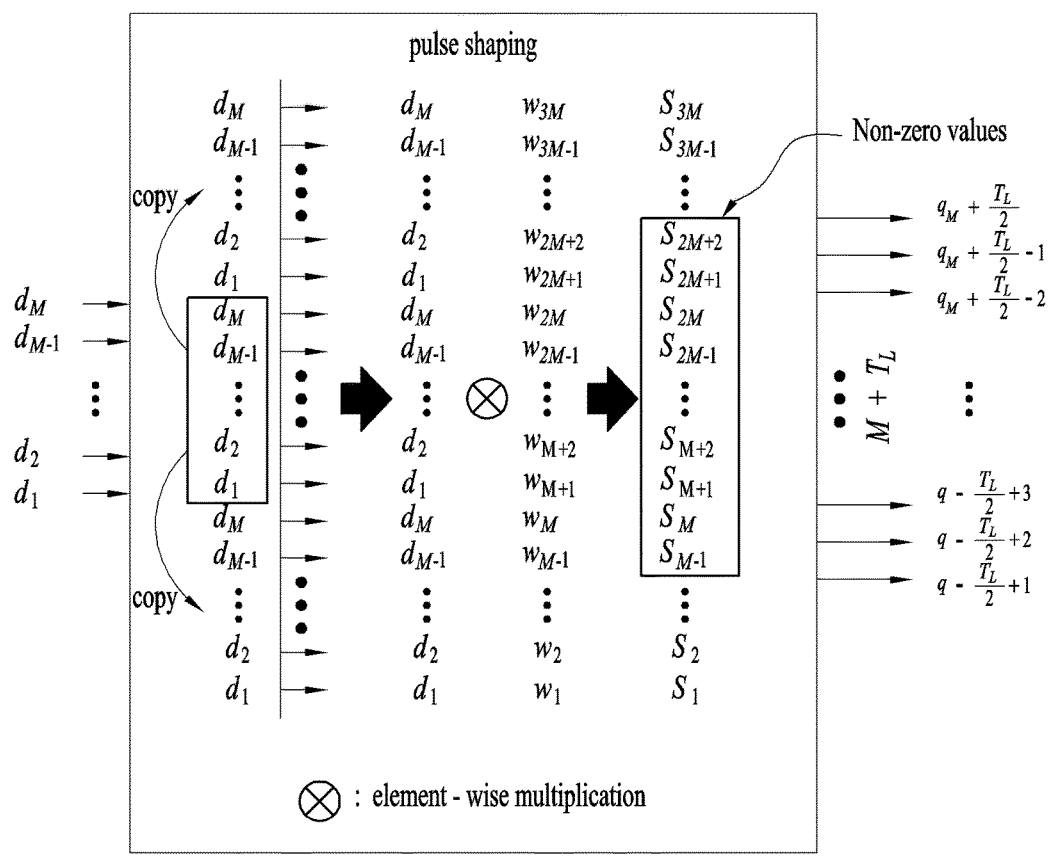
FIG. 8 illustrates operation of a pulse shaping block according to an embodiment of the present invention.

FIG. 8 shows operation of a pulse shaping block.

As shown in FIG. 8, the modulated symbols $d_1$ to $d_M$ are copied and then attached to both sides. Thereafter, element-wise multiplication of the repeated modulated symbols $d_1$ to $d_M$ and windowing weight values $w_1$ to $w_{3M}$ to be pulse-shaped is performed.

In other words, $s_K$ is obtained according to Equation 1.

$$s_k = d_{k\ \%\ M} \cdot w_k \text{ for } k=1, \ldots, 3M \quad \text{[Equation 1]}$$

In Equation 1, k % M indicates M modulo of k. That is, the result may have a value of 1 to M.

the windowing weight values $w_1$ to $w_{3M}$, which correspond to raised cosine filter values, can be obtained as shown in Equation 2.

$$w_k = \begin{cases} 0 & \text{for } k = 1, \ldots, M - \frac{T_L}{2} \\ \frac{1}{2}\left(1 + \cos\left(\pi\left(-1 + 1/(2T_L) + \left(k - M - \frac{T_L}{2} - 1\right)/T_L\right)\right)\right) & \text{for } k = M - \frac{T_L}{2} + 1, \ldots, M + \frac{T_L}{2} \\ 1 & \text{for } k = M + \frac{T_L}{2} + 1, \ldots, 2M - \frac{T_L}{2} \\ \frac{1}{2}\left(1 + \cos\left(\pi\left(1/(2T_L) + \left(k - 2M + \frac{T_L}{2} - 1\right)/T_L\right)\right)\right) & \text{for } k = 2M - \frac{T_L}{2} + 1, \ldots, 2M + \frac{T_L}{2} \\ 0 & \text{for } k = 2M + \frac{T_L}{2} + 1, \ldots, 3M \end{cases} \quad \text{[Equation 2]}$$

Next, among values of $s_k$, non-zero values are outputted. Thus, an output value, $q_k$ is mapped as shown in Equation 3.

$$q_k = s_{k+M} \text{ for } k = -\frac{T_L}{2} + 1, \ldots, M + \frac{T_L}{2} \quad \text{[Equation 3]}$$

Here, pulse shaping of a transmitted signal is determined based on β. In addition, a length ratio of a transition band to a pass band is determined.

Although this embodiment shows that the raised cosine filter is used, the present invention is not limited thereto and various weight values such as Hanning window and the like can be used.

After the pulse shaping, the remaining portions are filled with 0 and then IFFT is performed in consideration of a subband to be transmitted. The process for a baseband is completed by attaching CP after the IFFT. In this case, after the CP attachment, a windowing technique can be applied to the time domain.

Figure 9:
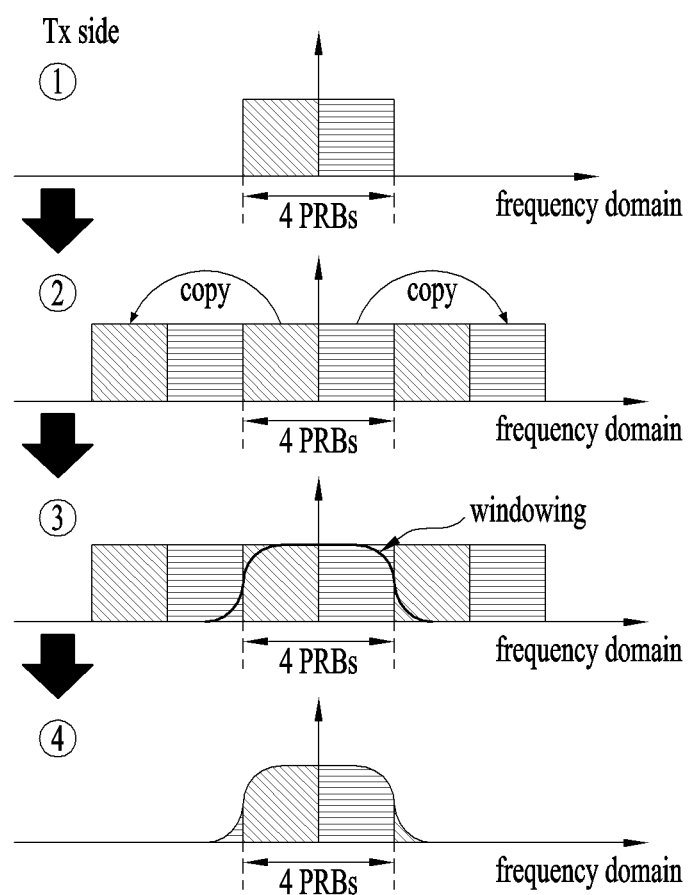
FIG. 9 illustrates a pulse shaping procedure in a frequency domain performed by a transmitter according to an embodiment of the present invention.

FIG. 9 illustrates a procedure for generating 4 PRBs of data and performing pulse shaping in the frequency domain before IFFT.

① shows that a transmitter generates modulated symbols corresponding to the 4 PRBs in the frequency domain by modulating information bits.

② shows that the transmitter copies the generated modulated symbols d1 ... $d_M$ at both sides. That is, the transmitter respectively repeats d1 ... $d_M$ at upper 4 PRBs and lower 4 PRBs, which are consecutive to the 4 PRBs where the modulated symbols are located.

③ shows the transmitter performs element-wise multiplication of 3M modulated symbols corresponding to total 12 PRBs and 3M windowing weight values.

④ shows pulse shapes of the modulated symbols after windowing.

Rx Structure

Figure 10:
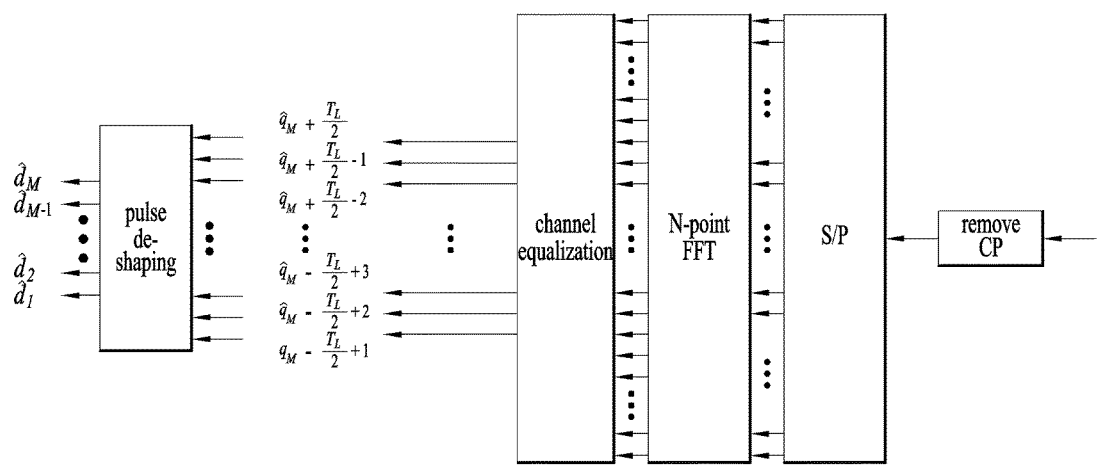
FIG. 10 illustrates a receiver (Rx) structure according to an embodiment of the present invention.

FIG. 10 illustrates a receiver (Rx) structure according to an embodiment of the present invention.

A receiver performs a reverse process of the pulse shaping process performed by the transmitting end and channel equalization in order to restore data. In an ideal case where there is no noise and a channel length is shorter than a CP, perfect restoration can be achieved without an error.

First, the receiver performs FFT after eliminating the CP from a received signal. Subsequently, the receiver performs the channel equalization using channel values of the corresponding subcarrier, which are obtained by channel estimation. In this case, the channel equalization is performed in a minimum mean square error manner.

Meanwhile, there may be noise enhancement in a portion where a reception SNR of the receiver is decreased due to the pulse shaping performed by the transmitter (e.g., portions truncated at the both ends of the 4 PRBs of FIG. 9). When performing the channel equalization on the portion where the reception SNR is decreased, the receiver can reduce the noise enhancement using data in a portion increased by the tapering length based on β (e.g., portions attached to the outside of the 4 PRBs of FIG. 9).

Thereafter, the receiver performs pulse de-shaping as shown in Equation 4.

$$\hat{d}_k = \begin{cases} \hat{q}_k + \hat{q}_{k+M} & \text{for } k = 1, \ldots, \frac{T_L}{2} \\ \hat{q}_k & \text{for } k = \frac{T_L}{2} + 1, \ldots, M - \frac{T_L}{2} \\ \hat{q}_k + \hat{q}_{k-M} & \text{for } k = M - \frac{T_L}{2} + 1, \ldots, M \end{cases} \quad [\text{Equation 4}]$$

In Equation 4, $\hat{d}_k$ indicates an estimated value of a modulated symbols and $\hat{q}_k$ indicates an estimated value of $q_k$.

The receiver restores original data (e.g., information bits) after acquisition of $\hat{d}_k$.

It is a matter of course that channel coding can be performed during transmission and reception but a channel coding process is not mentioned herein for clarity of description.

Figure 11:
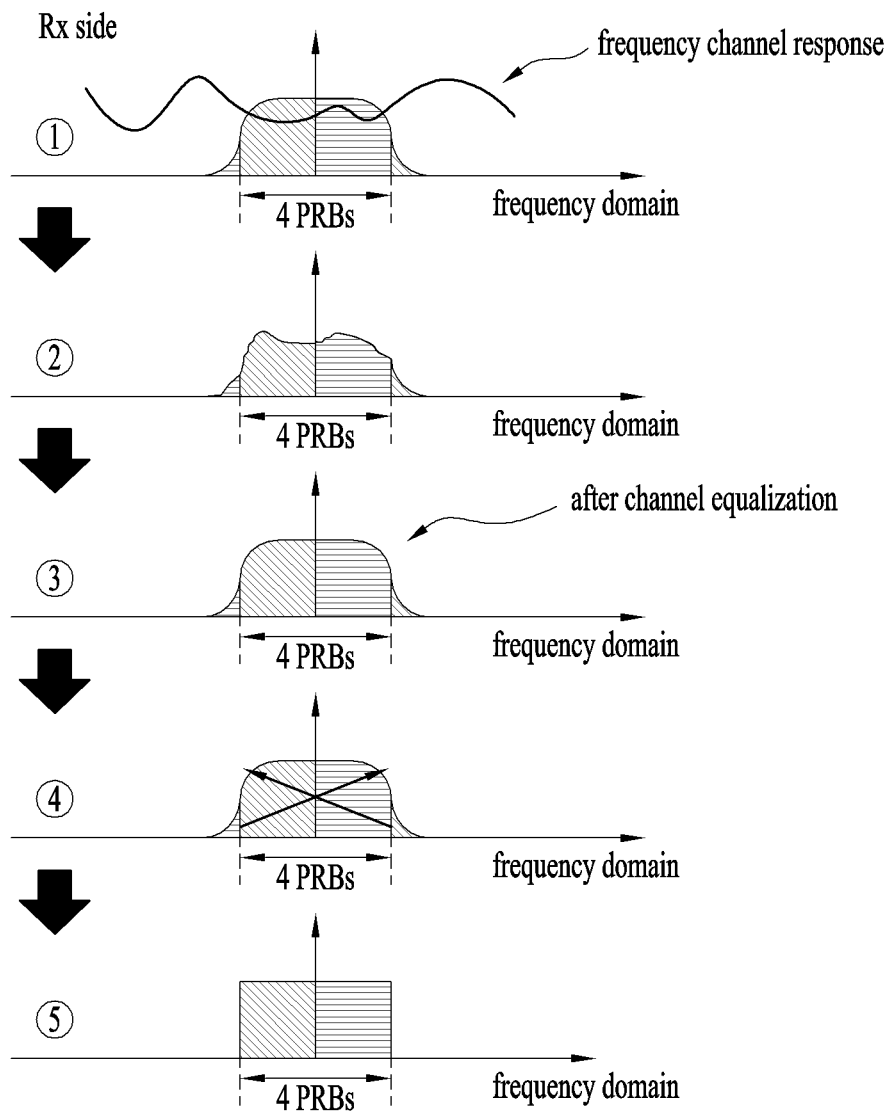
FIG. 11 illustrates a procedure by which a receiver restores data transmitted from a transmitter according to an embodiment of the present invention.

FIG. 11 illustrates a procedure by which a receiver restores data transmitted from a transmitter. In this case, the receiver assumes the ideal case where there is no noise.

① shows a signal and channel response in the frequency domain after the receiver eliminates a CP from a received signal and then performs FFT.

② shows a signal that passes through a channel.

③ shows a restored signal after the receiver performs channel equalization.

④ shows that a receiver restores an original signal through an overlapping and adding process.

⑤ shows a final restored signal.

EXAMPLES

Based on the description of the transmitter and receivers, embodiments of the present invention will be explained in detail.

(1) Example #1

In the case of identical numerology and asynchronous reception, a value of β or a tapering length can be implicitly determined based on a size of allocated data (e.g., the number M of modulated symbols) to satisfy the given leakage power constraints.

In this case, the value of β is determined to be inversely proportional to M as shown in the equation of $T_L=2\times\text{round}(\beta/2\times M)$. For example, β can be determined such that $\beta=\alpha/M$, where α is a fixed value or a value predetermined between the transmitter and receiver. In addition, the receiver detects the received signal by obtaining the value of $T_L$ or β in the same manner.

By adjusting the value of β in proportion to 1/M, the leakage requirements can be satisfied regardless of data sizes.

For example, it is possible to assume a requirement in which when there are X tone offsets from data edge tones, leakage power should be equal to or less than Y dB. In this case, both of the transmitter and receiver can know details of the pulse shaping according to the value of β as described above. Specifically, assuming that a UE is scheduled to transmit data with size of M to a BS (e.g., through a UL grant), the UE can obtain the greatest value of β satisfying that signal power in $T_L/2$ tone offset is equal to or lower by at most Y dB than the maximum power of a transmitted signal from among values of β that satisfy the equation of $T_L=2\times\text{round}(\beta/2\times M)$. Thereafter, the UE can transmit an uplink signal using the greatest value β value.

In other words, the receiver can obtain not only the size of M and the value of β through the equation $T_L=2\times\text{round}(\beta/2\times M)$ but also a spectrum spreading factor (i.e., $T_L$) of a signal according to β in a similar manner. Eventually, the receiver can detect the signal.

Although in this embodiment, uplink transmission is assumed, it can be applied to a case in which a UE operates as a receiver. That is, if a BS informs the value of M through a DL grant, the UE can obtain the values of β and $T_L$ in the same manner and then detects a downlink signal.

(2) Example #2

In the case of identical numerology and asynchronous reception, a guard band value (i.e., $T_L/2$) can be explicitly signaled to satisfy the given leakage power constraints.

For example, when a BS operates as a receiver, the BS can determine the β value and guard band value (i.e., $T_L/2$) for satisfying the leakage power constraints based on the defined spectrum equation for the pulse shaping, $T_L=2\times$ round(β/2×M) and M. Thus, when the BS explicitly informs a UE of the guard band value, the UE can obtain the β value using the $T_L/2$ value and allocated data size, M. Thereafter, the UE transmits an uplink signal after performing the pulse shaping based on the β value and the BS detects the signal.

In this case, the guard band value may be represented as the number of subcarriers, a bundle unit of subcarriers, or an RB unit. In addition, the guard band value can be transmitted to the UE through a UL grant DCI message for data allocation. Alternatively, the guard band value can be transmitted through a higher layer signal such as RRC.

(3) Example #3

If there are subbands corresponding to different numerology and the different numerology has different subcarrier spacing, a BS can set different guard band values (i.e., $T_L/2$) for different numerology scenarios according to services. Based on the different guard band values, each UE can determine a value of β.

That is, since the different numerology has the different subcarrier spacing, different guard bands need to be configured for the different numerology for leakage power control. For example, when a guard band is represented as the number of subcarriers, the number of subcarriers required for the guard band may vary depending on subcarrier spacing. Specifically, assuming that there is different subcarrier spacing of 15 kHz and 30 kHz, in the 15-kHz numerology, a guard band of 60 kHz may be configured with 4 tones (i.e., 4 subcarriers) and in the 30-kHz numerology, a guard band of 60 kHz may be configured with 2 tones (i.e., 2 subcarriers). In this case, the UE can determine the β value according to served numerology.

(4) Example #4

Similar to the example #3, if there are subbands corresponding to different numerology and the different numerology has different subcarrier spacing, a BS can determine a guard band value with reference to the smallest subcarrier spacing and each UE can determine a value of β based on the determined guard band value.

In this example, it is assumed that a UE knows a list of numerology served through the current carrier and subcarrier spacing of the numerology. The UE can determine the β value based on a ratio of the subcarrier spacing of the numerology served to the corresponding UE and minimum subcarrier spacing. For example, the UE may determine the β value by considering the multiplication of the corresponding ration and the number of tones for the guard band. Specifically, if the subcarrier spacing of the currently provided service is 60 kHz, the minimum subcarrier spacing is 15 kHz, and the number of guard band subcarriers is 4, the UE can determine the β value by assuming that only a single 60-kHz tone is $T_L/2$.

As described above, when different subbands with different subcarrier spacing are multiplexed on a single carrier, interference between subbands may occur due to absence of orthogonality. Leakage requirements with respect to interference can be given for in-band multiplexing of subbands. According to the embodiments of the present invention, a controllable tapering length is proposed to transmit different sizes of passbands while satisfying the given leakage requirements. In addition, it is possible to implement a frequency-domain transmitting and receiving device, which is more efficient than time-domain filtering, through the tapering length control.

The subcarrier spacing and orthogonality in the OFDM scheme will be described in brief. A signal corresponding to each subcarrier has zero-crossing points in the frequency domain with a certain periodicity. That is, when subcarriers are placed at all the zero-crossing points appearing at the certain periodicity, the orthogonality can be maintained without interference between different subcarriers. If subcarrier spacing is not maintained constantly, a subcarrier may be placed at a point rather than the zero-crossing points and thus, signals of other subcarriers may cause interference to a signal of the subcarrier placed at the corresponding point.

It is assumed that subcarrier spacing of subband 1 is different from that of subband 2 and zero-crossing points of the subband 1 do not match those of the subband 2. If the subband 1 is adjacent to the subband 2 or they are sufficiently close to each other, inter-subband interference may occur between the subbands 1 and 2. To reduce the interference caused by a mismatch of zero-crossing points within an allowable range, transmitters for the subbands 1/2 apply the aforementioned pulse shaping to signals of the subbands 1/2. For example, portions truncated at the both ends of the 4 PRBs of FIG. 8 and portions attached to the outside of the 4 PRBs of FIG. 8 can be used to cancel the interference caused by the mismatch of zero-crossing points. However, since the number M of modulated symbols of a transmitted and received signal is not always fixed, it is difficult to assume values of β and/or $T_L$ to be fixed. Thus, the β and/or $T_L$ values variable according to the value of M and the subcarrier spacing can be implicitly/explicitly signaled or determined. In other words, β and/or $T_L$ could be interpreted as controllable parameters, which depend on the value of M and the subcarrier spacing.

Figure 12:
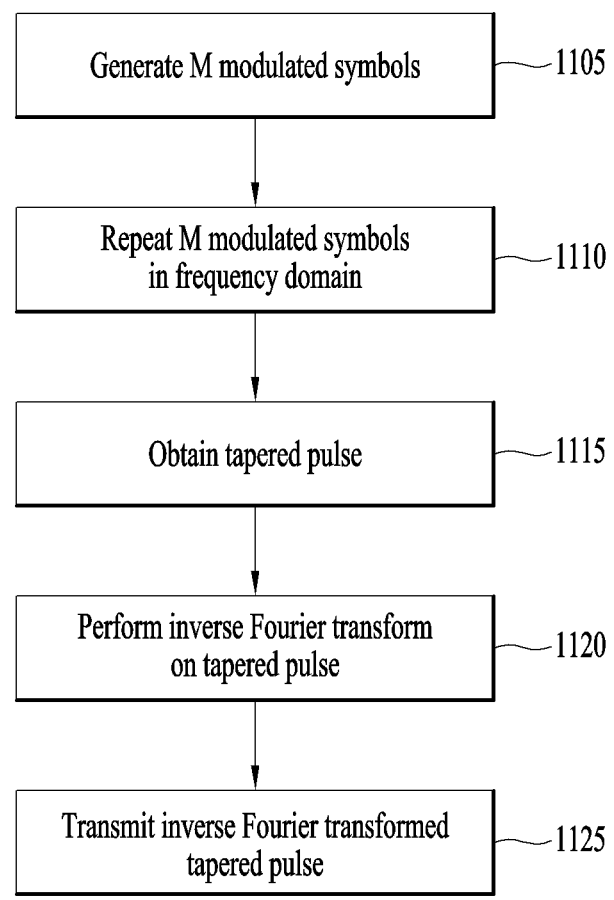
FIG. 12 illustrates a flowchart of a signal transmission and reception method according to an embodiment of the present invention.

FIG. 12 illustrates a flowchart of a signal transmission and reception method according to an embodiment of the present invention.

In FIG. 12, a UE corresponds to the above-described transmitter and a BS corresponds to the above-described receiver. The UE can transmit an uplink signal on a carrier where a plurality of subbands with different subcarrier spacing are multiplexed.

Referring to FIG. 12, the UE generates M modulated symbols by modulating uplink data [1105].

The UE repeats the M modulated symbols in both an upper frequency block and a lower frequency block, which are adjacent to a predetermined frequency block for the M modulated symbols and have the same size as that of the predetermined frequency block [1110]. In other words, the UE copies the M modulated symbols.

The UE multiplies a total of 3M modulated symbols, which are obtained through the repetition, and a total of 3M windowing weight values in an element-wise manner and then acquires a tapered pulse [1115].

The UE performs an inverse Fourier transform (e.g., IFFT) on the tapered pulse [1120].

The UE transmits the tapered pulse where the inverse Fourier transform is performed [1125].

The UE can restrict leakage power to subbands unsynchronized with its operating subband to be equal to or lower than a threshold by adjusting a tapering length of the tapered pulse.

In this case, the tapering length can be determined to be inversely proportional to M, the number of the generated modulated symbols.

Further, the tapering length ($T_L$) is determined based on the equation of $T_L=2\times \text{round}(\beta/2\times M)$, where 'round' is a rounding function and '$\beta$' is a constant within a range of 0 to 1.

When the threshold is Y dB, the UE can select a greatest value of $\beta$ that makes power in $T_L/2$ subcarrier offset with respect to the frequency block be equal to or lower by at most Y dB than the maximum power from among values of $\beta$ that satisfy the equation of $T_L=2\times \text{round}(\beta/2\times M)$.

The UE can receive downlink control information corresponding to an uplink grant from the BS. In this case, the downlink control information may include at least one of $T_L$, M and $\beta$.

The UE can receive information on subcarrier spacing of each subband and information on a guard band.

The information on the guard band indicates a guard band of a subband with the minimum subcarrier spacing among the subbands. The UE can obtain a guard band of its operating subband using a ratio of subcarrier spacing of its operating subband and the minimum subcarrier spacing of the subband.

The windowing weight values may correspond to weight values of a raised cosine filter.

The weight values of the raised cosine filter are obtained as shown in the Equation 2 above. In Equation 2, 'k' is a weight value index having a value from 1 to 3M and indicates the tapering length.

Figure 13:
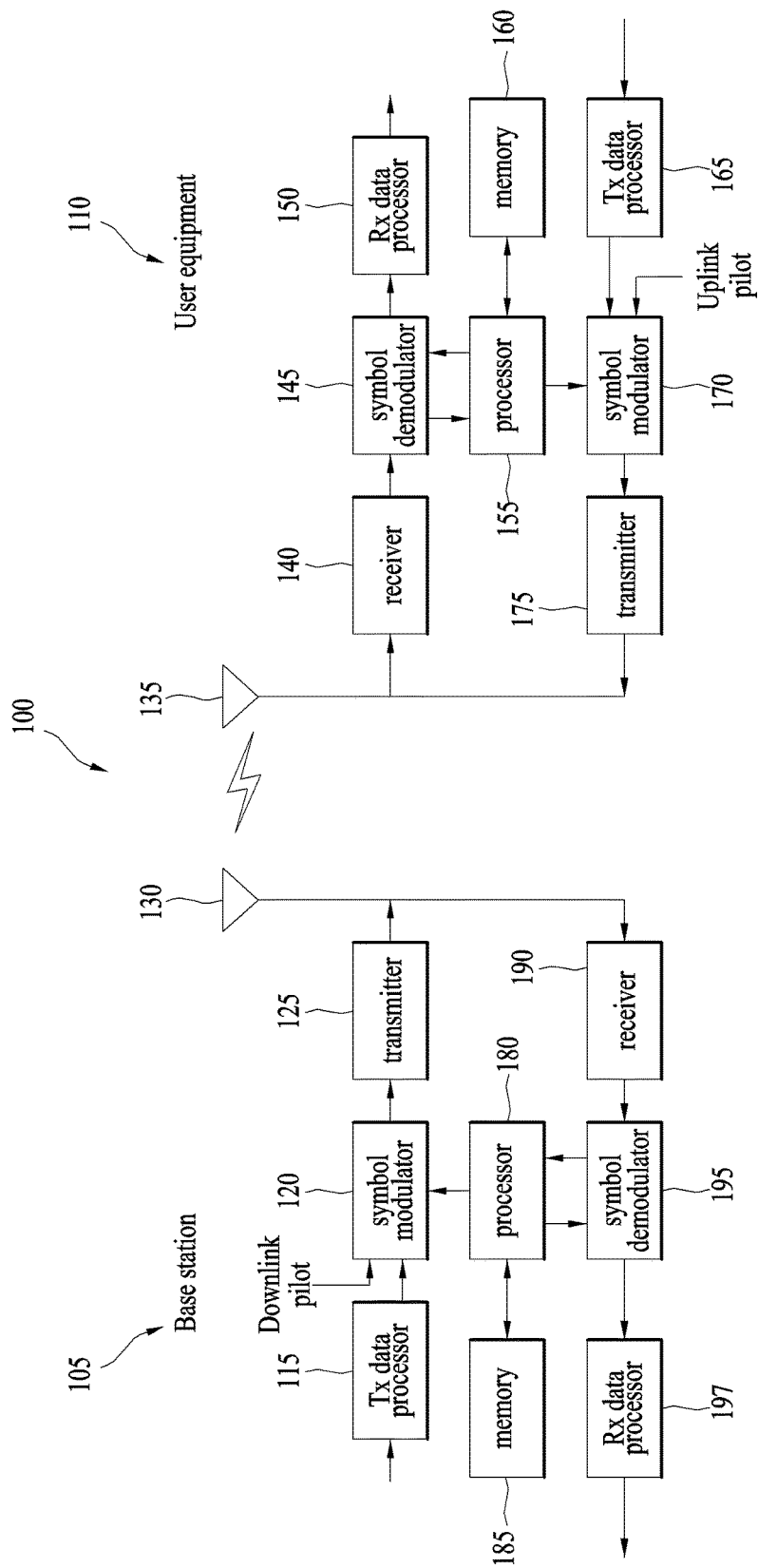
FIG. 13 illustrates a base station and a user equipment according to an embodiment of the present invention.

FIG. 13 is a block diagram illustrating a base station (BS) 105 and a user equipment (UE) 110 for use in a wireless communication system 100 according to the present invention.

Although FIG. 13 shows one UE 105 and one UE 110 (including a D2D UE) for brief description of the wireless communication system 100, it should be noted that the wireless communication system 100 may further include one or more BSs and/or one or more UEs.

Referring to FIG. 13, the BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 13, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the BS 105 through the antenna 135.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for transmitting an uplink signal by a user equipment (UE) on a carrier where a plurality of subbands each having different subcarrier spacing, are multiplexed, the method comprising:

generating M modulated symbols by modulating uplink data;

repeating the M modulated symbols in both an upper frequency block and a lower frequency block, which are adjacent to a predetermined frequency block for the M modulated symbols and have a same size as that of the predetermined frequency block;

obtaining a tapered pulse by multiplying a total of 3M modulated symbols which are a result of the repetition, and a total of 3M windowing weight values in an element-wise manner; and performing an inverse Fourier transform on the tapered pulse and transmitting the inverse Fourier transformed tapered pulse, wherein the UE restricts leakage power to subbands which are unsynchronized with an operating subband of the UE, to be equal to or lower than a threshold by adjusting a tapering length of the tapered pulse.

2. The method of claim 1, wherein the tapering length is determined to be inversely proportional to a number of the generated modulated symbols 'M'.

3. The method of claim 2, wherein the tapering length ($T_L$) is determined according to an equation:

$$T_L = 2 \times \text{round}(\beta/2 \times M)$$

where 'round' is a rounding function and 'β' is a constant within a range of 0 to 1.

4. The method of claim 3, wherein when the threshold is Y dB, the UE selects a greatest value of β that makes power in $T_L/2$ subcarrier offset with respect to the predetermined frequency block be equal to or lower by at most Y dB than maximum power from among values of β that satisfy the equation of $T_L = 2 \times \text{round}(\beta/2 \times M)$.

5. The method of claim 3, further comprising:

receiving downlink control information corresponding to an uplink grant from a base station (BS), wherein the downlink control information indicates at least one of '$T_L$', 'M' and 'β'.

6. The method of claim 1, further comprising:

receiving information on subcarrier spacing of each subband and information on a guard band from a base station (BS).

7. The method of claim 6, wherein the information on the guard band indicates a guard band of a subband with minimum subcarrier spacing among the subbands and wherein the UE obtains a guard band of the operating subband using a ratio of subcarrier spacing of the operating subband and the minimum subcarrier spacing of the subband.

8. The method of claim 1, wherein the windowing weight values correspond to weight values of a raised cosine filter.

9. The method of claim 8, wherein the weight values of the raised cosine filter are obtained from the following equation:

$$w_k = \begin{cases} 0 & \text{for } k = 1, \ldots, M - \frac{T_L}{2} \\ \frac{1}{2}\left(1 + \cos\left(\pi\left(-1 + 1/(2T_L) + \left(k - M - \frac{T_L}{2} - 1\right)/T_L\right)\right)\right) & \text{for } k = M - \frac{T_L}{2} + 1, \ldots, M + \frac{T_L}{2} \\ 1 & \text{for } k = M + \frac{T_L}{2} + 1, \ldots, 2M - \frac{T_L}{2} \\ \frac{1}{2}\left(1 + \cos\left(\pi\left(1/(2T_L) + \left(k - 2M + \frac{T_L}{2} - 1\right)/T_L\right)\right)\right) & \text{for } k = 2M - \frac{T_L}{2} + 1, \ldots, 2M + \frac{T_L}{2} \\ 0 & \text{for } k = 2M + \frac{T_L}{2} + 1, \ldots, 3M \end{cases}$$

where 'k' is a weight value index having a value from 1 to 3M and '$T_L$' indicates the tapering length.

10. A user equipment (UE) for transmitting an uplink signal on a carrier where a plurality of subbands each having different subcarrier spacing, are multiplexed, the UE comprising:
a processor configured to generate M modulated symbols by modulating uplink data, repeating the M modulated symbols in both an upper frequency block and a lower frequency block, which are adjacent to a predetermined frequency block for the M modulated symbols and have a same size as that of the predetermined frequency block, obtain a tapered pulse by multiplying a total of 3M modulated symbols, which are a result of the repetition, and a total of 3M windowing weight values in an element-wise manner, and perform an inverse Fourier transform on the tapered pulse; and
a transmitter configured to transmit the inverse Fourier transformed tapered pulse under control of the processor,
wherein the processor restricts leakage power to subbands which are unsynchronized with an operating subband of the processor, to be equal to or lower than a threshold by adjusting a tapering length of the tapered pulse.

11. The UE of claim 10, wherein the tapering length is determined to be inversely proportional to a number of the generated modulated symbols 'M'.

12. The UE of claim 11, wherein the tapering length ($T_L$) is determined according to an equation:

$T_L = 2 \times \text{round}(\beta/2 \times M)$ where 'round' is a rounding function and '$\beta$' is a constant within a range of 0 to 1.

13. The UE of claim 12, wherein when the threshold is Y dB, the processor is configured to select a greatest value of $\beta$ that makes power in $T_L/2$ subcarrier offset with respect to the predetermined frequency block be equal to or lower by at most Y dB than maximum power from among values of $\beta$ that satisfy the equation of $T_L = 2 \times \text{round}(\beta/2 \times M)$.

14. The UE of claim 12, further comprising:
a receiver configured to receive downlink control info' nation corresponding to an uplink grant from a base station (BS), wherein the downlink control information indicates at least one of '$T_L$', 'M' and '$\beta$'.

15. The UE of claim 10, further comprising:
a receiver configured to receive information on subcarrier spacing of each subband and information on a guard band from a base station (BS).

16. The UE of claim 15,
wherein the information on the guard band indicates a guard band of a subband with minimum subcarrier spacing among the subbands and
wherein the processor is configured to obtain a guard band of the operating subband using a ratio of subcarrier spacing of the operating subband and the minimum subcarrier spacing of the subband.

17. The UE of claim 10, wherein the windowing weight values correspond to weight values of a raised cosine filter.

18. The UE of claim 17, wherein the weight values of the raised cosine filter are obtained from the following equation:

$$w_k = \begin{cases} 0 & \text{for } k = 1, \ldots, M - \frac{T_L}{2} \\ \frac{1}{2}\left(1 + \cos\left(\pi\left(-1 + 1/(2T_L) + \left(k - M - \frac{T_L}{2} - 1\right)/T_L\right)\right)\right) & \text{for } k = M - \frac{T_L}{2} + 1, \ldots, M + \frac{T_L}{2} \\ 1 & \text{for } k = M + \frac{T_L}{2} + 1, \ldots, 2M - \frac{T_L}{2} \\ \frac{1}{2}\left(1 + \cos\left(\pi\left(1/(2T_L) + \left(k - 2M + \frac{T_L}{2} - 1\right)/T_L\right)\right)\right) & \text{for } k = 2M - \frac{T_L}{2} + 1, \ldots, 2M + \frac{T_L}{2} \\ 0 & \text{for } k = 2M + \frac{T_L}{2} + 1, \ldots, 3M \end{cases}$$

where 'k' is a weight value index having a value from 1 to 3M and '$T_L$' indicates the tapering length.

* * * * *